United States Patent [19]
McFarland

[11] Patent Number: 5,160,444
[45] Date of Patent: Nov. 3, 1992

[54] COOKING OIL FILTERING METHOD AND APPARATUS

[76] Inventor: George E. McFarland, 5316 Lana St., Carm, Calif. 95608

[21] Appl. No.: 245,907

[22] Filed: Sep. 19, 1988

[51] Int. Cl.$^5$ .................. B01D 27/10; B01D 27/14; B01D 37/00

[52] U.S. Cl. .................................. 210/805; 210/806; 210/90; 210/138; 210/120; 210/167; 210/186; 210/195.1; 210/196; 210/254; 210/257.1; 210/259; 210/241; 210/314; 210/335; 210/436; 210/437; 210/472; 210/DIG. 8

[58] Field of Search ............ 210/805, 806, 186, 195.1, 210/196, 254, 257.1, 258, 259, 241, 314, 335, 436, 472, 90, 167, 120, DIG. 8, 437, 138

[56] References Cited

U.S. PATENT DOCUMENTS

| | | | |
|---|---|---|---|
| 2,365,766 | 12/1944 | Levier | 210/437 |
| 2,381,627 | 8/1945 | Thompson | 210/437 |
| 2,425,848 | 8/1947 | Vawter | 210/DIG. 8 |
| 2,633,244 | 3/1953 | Rood | 210/437 |
| 2,639,783 | 5/1953 | Kovacs | 210/437 |
| 3,356,218 | 12/1967 | Grudowski | 210/241 |
| 3,368,682 | 2/1968 | Boots | 210/259 |
| 3,616,907 | 11/1971 | Van Vleet | 210/DIG. 8 |
| 3,880,757 | 4/1975 | Thomason | 210/167 |
| 3,900,580 | 8/1975 | Boggs | 210/167 |
| 3,968,741 | 7/1976 | Hunt | 210/186 |
| 3,977,973 | 8/1976 | Anderson | 210/167 |
| 4,043,916 | 8/1977 | Wecker, Sr. | 210/167 |
| 4,282,094 | 8/1981 | Mitchell | 210/DIG. 8 |
| 4,328,097 | 5/1982 | Whaley et al. | 210/DIG. 8 |
| 4,443,334 | 4/1984 | Shugarman et al. | 210/120 |
| 4,517,082 | 5/1985 | Prudhomme | 210/DIG. 8 |
| 4,519,904 | 5/1985 | Helmick | 210/167 |
| 4,591,434 | 5/1986 | Prudhomme | 210/DIG. 8 |
| 4,702,827 | 10/1987 | Wenzel | 210/167 |
| 4,747,944 | 5/1988 | George | 210/167 |
| 4,758,336 | 7/1988 | Bock et al. | 210/90 |
| 4,768,426 | 9/1988 | Nett | 210/167 |
| 4,826,590 | 5/1989 | Turman | 210/DIG. 8 |

Primary Examiner—Stanley S. Silverman
Assistant Examiner—Cynthia L. Nessler
Attorney, Agent, or Firm—Bernhard Kreten

[57] ABSTRACT

A filtering apparatus and method for removing solid impurities contained within a fluid. A plurality of filters each define successive stages and are linked in series whereby the output from a first filter feeds the input of a second filter and so on. Successive stages remove impurities of progressively smaller particle size whereupon the last stage provides a fluid substantially clean of all impurities and polished for subsequent reuse. The specific environment associated with the instant apparatus and method involves cleaning cooking oil in deep fat fryers.

20 Claims, 3 Drawing Sheets

COOKING OIL FILTERING METHOD AND APPARATUS

FIELD OF THE INVENTION

The following invention relates generally to a method and apparatus for filtering solid impurities carried within a fluid. More specifically, the apparatus and method disclosed herein involves the removal of food particles entrained in cooking oil contained within a reservoir of so called deep fat cookers.

BACKGROUND OF THE INVENTION

Deep fat cooking entails the use of a considerable volume of cooking oil which is elevated to a certain temperature and thereafter receives food to be cooked by immersion, typically contained in a basket. Once cooked, the food is removed from the cooking oil by elevating the basket from the oil.

This type of cooking has been the subject of some criticism on at least two fronts: the first involves the potential use of oil having harmful, high saturated fat (cholesterol) levels, and the second involves the hygienic aspect of continued reuse of oil which has cooking impurities retained within the oil from the ongoing use of the cooking oil. Collectively, these two problems merge to form a third economic consideration: namely, the use of high-quality oil having low cholesterol versus the need for frequent replacement of the oil as it becomes contaminated by prior cooking impurities left behind during the cooking process.

The first problem, the saturated fat value of the oil, can be resolved, ideally, with the use of known, low cholesterol oils. However, these oils are more expensive. The economic constraints in providing a food product which is within reach of mass market consumers puts a practical limit on both the price to be paid for the oil and the frequency with which the oil is replaced as it becomes laden with cooking impurities.

SUMMARY OF THE INVENTION

Applicant has discovered the steps by which clean cooking oil degrades into a form which is not suitable for continued reuse as a cooking oil and must therefore be discarded. It should be noted that there is a "secondary" reclamation market for used cooking oil in other industries, and therefore an environmental disposal problem does not exist to any great degree.

First, particles of food, food coatings, breading etc. remain in the cooking oil once the food is removed. Even the smallest of these particles remaining in the oil is sufficiently large (e.g. five microns) to be removed by a mechanical filter. As these particles remain in the cooking oil and the cooking oil remains heated at an elevated cooking temperature, these entrained impurities obviously continue to be cooked. At the end of a typical cooking cycle in a commercial establishment (e.g., 10-15 hours of operation a day) these impurities are still capable of recapture by mechanical filtering.

Accordingly, periodic filtering of the cooking oil (preferably on a daily basis either on the end of a business day or at the beginning of the next day) will assure that impurity laden cooking oil can be cleaned thereby increasing the useful life of the cooking oil indefinitely. It is to be noted that continued re-use of impurity laden cooking oil gradually causes the small particles left behind from the cooking process to not only carbonize but also to be reduced in particle dimension where mechanical filtering will not be effective.

Moreover, retention of cooking impurities in the cooking oil, even if the cooking oil is refrigerated when not in use, will ultimately turn the oil rancid by having been contaminated both by the impurities and by the carbonization of the cooking oil. Even a non-discerning consumer will be able to notice the characteristics of food cooked in this environment: the food although cooked and of the appropriate color will be limp, soggy and have an off odor.

During a restaurant's normal cooking cycle (e.g., one 10-15 hour cooking day) a certain amount of the cooking oil (perhaps 10 percent) is carried on the food being served, providing an attrition of the oil contained within the cooking reservoir. Even by replenishment with fresh oil, the impurities contained within the used oil provide an objectionable presence. Thus, the instant invention is directed to an apparatus and method wherein the cooking oil is periodically filtered prior to the degradation of the impurities to such an extent that they cannot pass through a mechanical filter. Thus, as a prophylactic measure, this oil filtering can be done on a daily basis to assure that the cooking oil remains uncontaminated and sufficiently cleaned that it may be called "polished" by the filtering process.

Simply stated, most of the oil contained within a deep fat cooking reservoir is scavenged from the reservoir except for the heaviest debris which has gravitated to the bottom of the reservoir. This scavenged impurity laden oil is first pumped to a temporary holding vessel. While stored thereat, the cooking reservoir is cleaned of the remaining debris and is thereafter ready for readmission of cleaned polished cooking oil. The impurity laden cooking oil contained in the temporary storage vessel is directed to a filter mechanism. In a preferred form of the invention, the filter mechanism is a three-stage series of filters, with the stages varying in their ability to entrain impurities ranging from a first stage having a 5 micron porosity through to a final stage capable of entraining particles having a dimension of 0.5 microns or larger.

Although carbonized particles have a dimension less than five microns, because the oil is cleaned on a daily basis, the impurities will be greater than five microns before carbonization has occurred. The cooking oil, exiting the last stage filter is free from impurities and returned to the cooking reservoir.

Because of the attrition associated with the cooking process itself, the reservoir will need to be replenished with new cooking oil. But because of the filtering operation there is no discernable difference between the new cooking oil and the filtered cooking oil. Thus, this oil never needs replacement.

It is recognized that some types of cooking oil are solid at room temperature (e.g., lard). When this type of cooking oil is used, it is necessary to pre-heat the filter apparatus prior to filtering, since it is to be expected that residual oil left within the filter from a prior use will have congealed. In such an event, prior to scavenging the oil from the cooking reservoir, the cooker is first heated to approximately 170 degrees so that the contained oil is similarly at that temperature. An initial phase in transferring the cooking oil to the temporary storage vessel entails the routing of the cooking oil through a side of the filter defined as an inlet chamber for preheating the filter and therefore liquefying any cooking oil entrained therein from a prior use. When a multi-stage filter instrumentality is involved, preheating the multiple stages is required.

OBJECTS OF THE INVENTION

Accordingly, it is a primary object of the present invention to provide a novel and useful filtration apparatus particularly used in removing impurities laden within cooking oil.

A further object of the present invention is to provide a device as characterized above which obviates the need for replacement of relatively expensive cooking oil because there is no saturation with impurities from prior cooking. This allows an establishment to use higher quality oil for attendant health benefits since none of the oil is discarded from having been hopelessly contaminated with impurities.

The further object of the present invention contemplates providing a device as characterized above which is oriented to reside within a transportable cart to afford the apparatus maneuverability within the limited space typical of many cooking environments to address a deep fat cooker on a periodic basis and thereafter be returned to a storage area away from the daily operations of cooking.

A further object of the present invention is to provide a device as characterized above which is extremely durable in construction, lends itself to mass production techniques and is safe to use.

A further object of the present invention is to provide a device as characterized of which indefinitely extends the life of an oil by removing entrained impurities on a periodic basis through mechanical filtering means prior to the impurities' devolution to a particle size incapable of sufficient removal.

It is a further object of the present invention to provide a device as characterized above wherein the actual operation of the filtering apparatus is of sufficient simplicity that the process can be efficiently conducted by persons having minimal training, thereby increasing the likelihood that the device will be used on a regular basis.

It is a further object of the present invention to provide a device as characterized above which improves the quality of the food serviced in the establishment while economically reducing the costs of the cooking operation itself.

Viewed from one vantage point, an object of the present invention includes the provision of a device for filtering solid impurities entrained in a fluid which includes a fluid pump having an inlet port and an outlet port, a suction hose connected to the inlet port and adapted to scavenge impurity laden fluid from a source to the pump, a filter instrumentality connected to the pump outlet port to receive the fluid and remove the solid impurities therefrom, and a discharge line connected to the filter instrumentality, receiving impurity-free fluid therefrom and adapted to return the fluid to its source whereby the fluid has been cleaned and suitable for reuse.

Viewed from a second vantage point, it is an object of the present invention to provide a filter instrumentality for removing solids from a fluid which includes a housing formed by a bottom wall, a top wall and a side wall interconnecting the top and bottom walls defining an interior of the housing, a filter element carried within the housing interior supported by the top and bottom walls and spaced from the side walls to define a first compartment, the filter element having a hollow core defining a second compartment, the first and second compartments separated from each other by filter media and a seal between the media and the top and bottom walls, and pressure instrumentalities forcing the fluid through the filter media and from one compartment to the other to clean the fluid.

Viewed from yet a third vantage point, it is an object of the present invention to provide a method for removing solid impurities from a fluid, the steps including scavenging all of the impurity-laden fluid from a reservoir except for the heaviest and most dense impurities at the bottom of the reservoir, transferring the scavenged fluid into a temporary storage vessel, cleaning the reservoir of all impurities, including residual fluid, filtering the scavenged fluid to remove solid impurities therefrom, returning the filtered fluid to the reservoir for reuse, and topping off the reservoir with new fluid to replenish unreclaimed fluid.

These and other objects will be made manifest when considering the following detailed specifications when taken in conjunction with the appended drawing figures.

BRIEF DESCRIPTION OF THE DRAWING FIGURES

BRIEF DESCRIPTION OF THE PREFERRED EMBODIMENT

Figure 1:
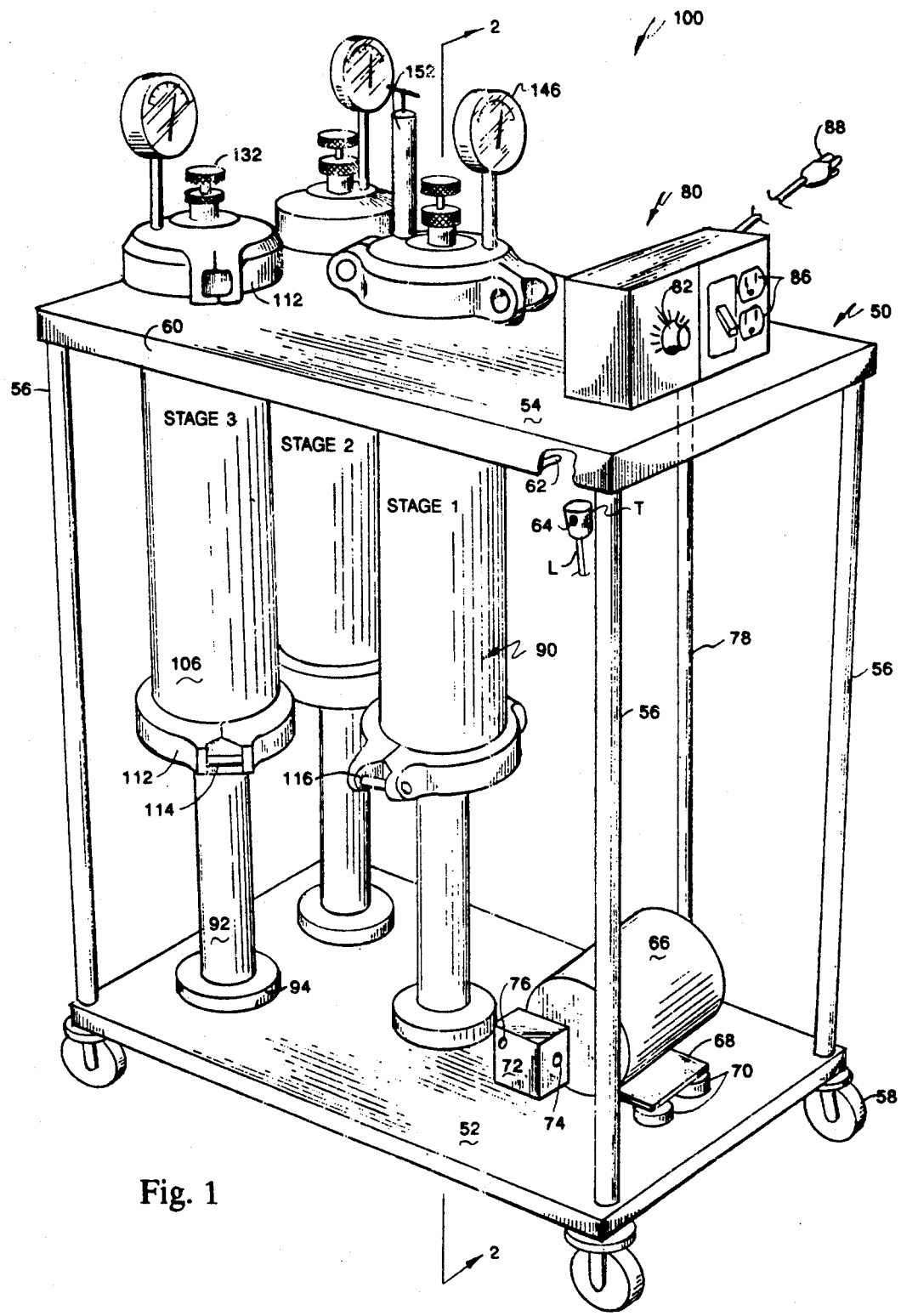
FIG. 1 is a perspective view of the apparatus according to the present invention with certain fluid circuit details omitted for greater clarity.

Referring to the drawings now, wherein like reference numerals refer to like parts throughout the various drawing figures, reference numeral 100 is directed to the filter assembly including a movable cart according to the present invention.

In its essence, the filter assembly 100 is formed with a cart 50 carrying a plurality of filters 90 thereon and includes a fluid circuit 10 to allow the through passage of cooking oil from a deep fat frying reservoir through the filter system and thence back to the reservoir with the oil in a clean polished state.

FIG. 1 details the cart 50. As shown, the cart 50 includes a lower platform 52, an upper platform 54 both oriented in a substantially horizontal plane and the upper platform offset from the lower platform at different vertical elevations. The upper and lower platforms are interconnected by means of four legs 56 extending from corners of each platform, which in a preferred form is a four sided rectangle. Below the lower platform, four downwardly extending coasters 58 contact a support surface and allow the cart 50 to be moved from its storage position away from the daily activities associated with cooking to an at use position adjacent a deep fat fryer (not shown).

The cart 50 includes a downwardly depending lip 60 extending from a peripheral edge of the upper platform 54. This lip 60 supports, on an inner surface thereof, below the surface of the upper platform 54, a plurality of outwardly extending prongs 62 which serve as supports for tips T connected to various lines L each having a hole 64 contained on the tip T for support on the prongs 62 in a compact manner. The lines L have been shown diagrammatically in FIG. 1 since in a preferred form four lines are used to allow the through passage of cooking oil to and from the filter assembly 100 as will be detailed in the discussion of FIG. 3. However, the placement of these lines L on a inner portion of the depending lip 60 allows the cart to be moved without the likelihood of these hoses contacting potentially tight quarters of a commercial kitchen.

A top surface of the lower platform 52 supports a motor 66 carried thereon via a motor frame 68 underlying the motor and supported on the lower platform by means of resilient feet 70 which dampen vibration inherent in most motors' operation. Integrally formed with the motor 66 is a pump 72 having an inlet 74 and an outlet 76 for purposes to be defined. The motor 66 is powered by means of a power cable 78 extending to a control box 80 carried on an upper surface of the upper platform 54. The control box 80 includes a timer 82 connected in series with a power switch 84 in turn communicating with a power cord 88 connected to a source of power in the kitchen (not shown). Accessory outlets 86 are provided to run ancillary equipment to be mentioned. The timer 82 and the power switch 84 are both used to enable motor 66.

FIG. 1 reflects three filter elements interposed between the upper and lower platforms 52, 54 and labeled stage 1, stage 2 and stage 3. These represent a three stage filter system through which the cooking oil passes, each stage having a filter capable of entraining particulate matter and successive filters designed to capture particles of increasingly finer size. Typically, stage 1 includes a filter capable of entraining particles greater than 5 microns in diameter, stage 2, 1 micron, and stage 3, 0.5 microns. It should be understood that these dimensional preferences, i.e., micron size porosity and number of stages are variable for the particular operation. In the cooking environment, it has been determined that the above recited specifications are more than adequate when the cooking oil is filtered on a daily basis.

Figure 2:
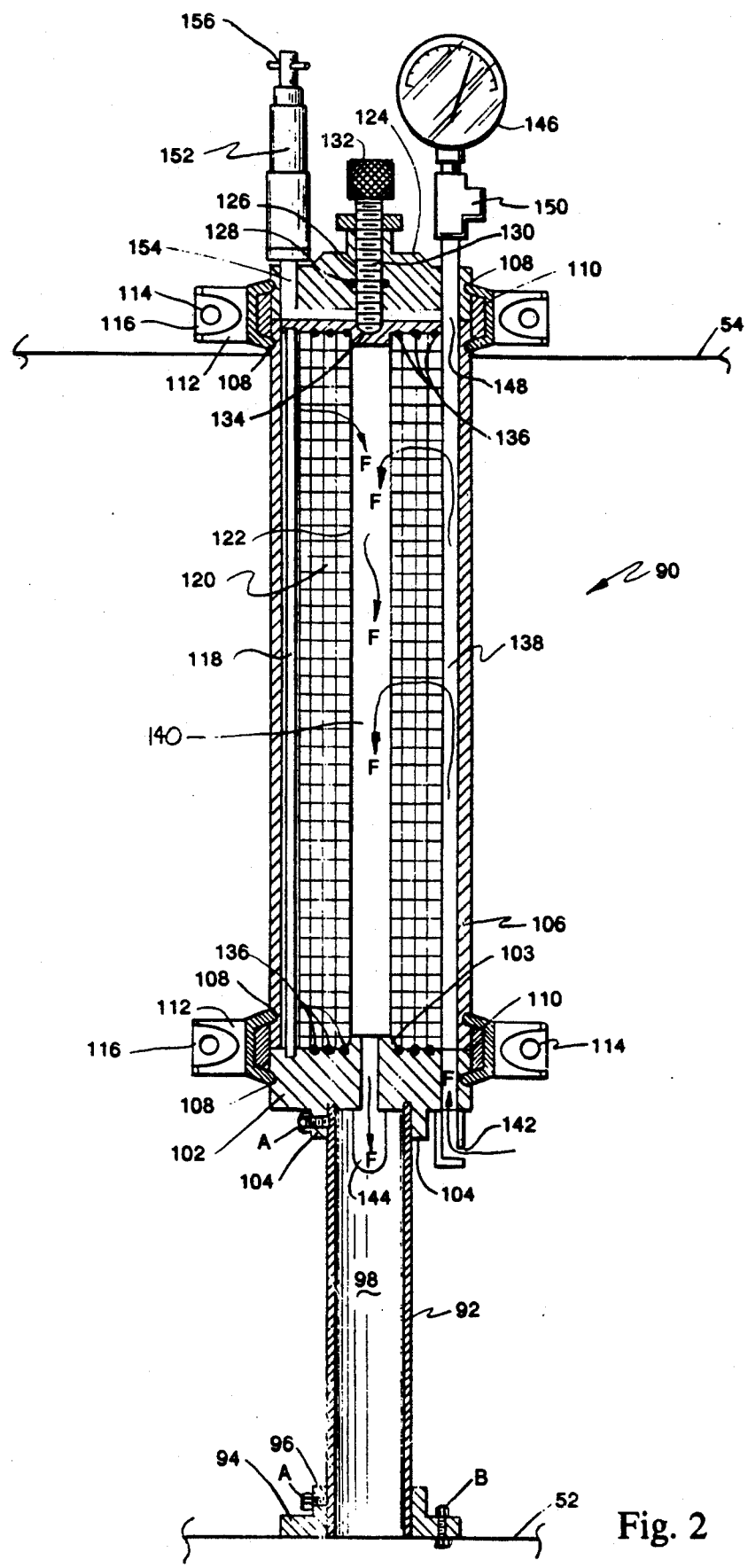
FIG. 2 is a sectional view taken along lines 2—2 of FIG. 1.

FIG. 2 reflects details common to the plural stages of filters 90 associated with the instant application set for the micron emissivity rating of each filter. The filter structure per se will be discussed infra.

The exemplary filter 90 of FIG. 2 includes a major portion interposed between lower platform 52 and upper platform 54. The filter 90 includes a pedestal 92 having a hollow interior 98 with the pedestal configured as a cylinder. A lower most portion of the pedestal 92 connects to the lower platform's upper surface by means of a flange 94 bolted with bolts B to the lower platform's surface. The flange 94 includes an upwardly extending collar 96 having a passage to allow an allen screw A to pass through the collar 96 and tighten to the pedestal 92.

An upper portion of the pedestal 92 supports a bottom cap 102 which defines a bottom wall of the filter container. In essence, the bottom cap 102 includes a top surface having a boss 103 upwardly extending and centrally disposed which circumscribes a central passageway 144 for purposes to be assigned. The bottom cap 102 supports a canister 106 and is connected thereto by means of victalic clamp 112 interconnecting the canister side wall 106 and an outer periphery of the bottom cap 102. More particularly, both the canister's side wall 106 and the bottom cap's periphery are provided with grooves 108 circumscribing the canister and the cap to receive therein the upper and lower prongs of the victalic clamp 112. The prongs have interposed therebetween a gasket 110 to provide a fluidic seal between the canister and the cap as shown in the drawings. The clamp 112 is made leak-proof by means of a screw tightener 114 which straddles ears 116 on the clamp to tightly gird the interconnected area of the canister and the bottom cap.

A top surface of the bottom cap also supports a plurality of recesses from which a plurality of vertical rods 118 extend upwardly and provide an outer skeletal structure within which a filter 120 is supported. The filter 120 includes a foraminous core 122 upon which is wound an elongate strand of bleached cotton string, woven on the core in a diamond shaped weave to serve as the filter medium. The micron size which will pass through the thus formed filter is determined by the tension at which the cotton string is wound on the core. Thus, in each of the three stages the tensile loading with which the string is wound in a diamond shaped pattern on the core 122 will determine the micron size defining the emissivity of the filter for the intended purpose. In the cooking environment, and with daily filtration of the cooking oil, a three stage system is preferred with the micron rating of the first through third stages respectively being 5, 1, and 0.5 microns.

The upper portion of the filter 90 includes a top cap 124 which defines the top wall of the filter assembly. The top cap 124 includes a central bore 126 through which passes a shaft 130. The shaft includes an O-ring 128 to preclude the through passage of cooking oil there beyond. The shaft 130 includes a knurled adjuster 132 on an outer free-end thereof for hand adjustment of a pressure plate 134 located below the top cap 124 and bearing down upon the filter 120 in a manner to be defined. In its essence, the pressure plate 134 is used in conjunction with a plurality of (preferably three) O-rings 136 located at both the top cap and bottom cap on facing surfaces thereof contacting the filter 120 to preclude the through passage of oil along the juncture between the filter and these caps. Thus, the oil is forced to go through the cotton string and thereby become liberated from the objectionable cooking impurities contained in the oil.

With the structure thus described, cooking oil is allowed to pass through an outer passageway 138 that is provided between the canister's inner wall 106 and the outer surface of the filter 120. The oil enters into this outer passageway 138 by means of an inlet 142 communicating with the filter. Inlet 142 is located at an outermost portion of the bottom cap 102 includes a fluid passageway passing through the bottom cap. Oil enters into an annular passageway 138 between the filter 120 and the canister 106. Because of both the tightness with which the filter is compressed between the top and bottom caps and pressure supplied by the motor 66 and pump 72, the cooking oil is forced through the filter 120 and past the foraminous core 122 that supports the filter. The tendency of the filter to distort by pressure between the top and bottom caps is offset to a certain degree by both the core 122 and the upwardly extending rods 118. The cooking oil passing through the filter arrives at a central inner passageway 140 along the vertical axis of the filter 90 and passes downwardly through a central bore 144 defining a filter outlet that passes through the bottom cap and thence outwardly through the pedestal 92 into the circuit to be defined in FIG. 3.

Each filter 90 includes a pressure gauge 146 which communicates with the outer passageway 138 by means of a gauge passageway 148 passing through the top cap 124. In addition, the conduit communicating the pressure gauge with the gauge passageway 148 includes an air bleed outlet 150 for purposes to be assigned.

The first stage filter also includes a pressure reducing valve (PRV) 152 which communicates with the outer passageway 138 through a second passageway, a PRV passageway 154. The pressure-reducing valve includes a conventional adjuster 156 to set the "cracking" pressure at which this pressure-reducing valve is to be operative. It is believed that the first stage is the only area where excessive pressure buildup must have such an outlet, which is adjustable.

Figure 3:
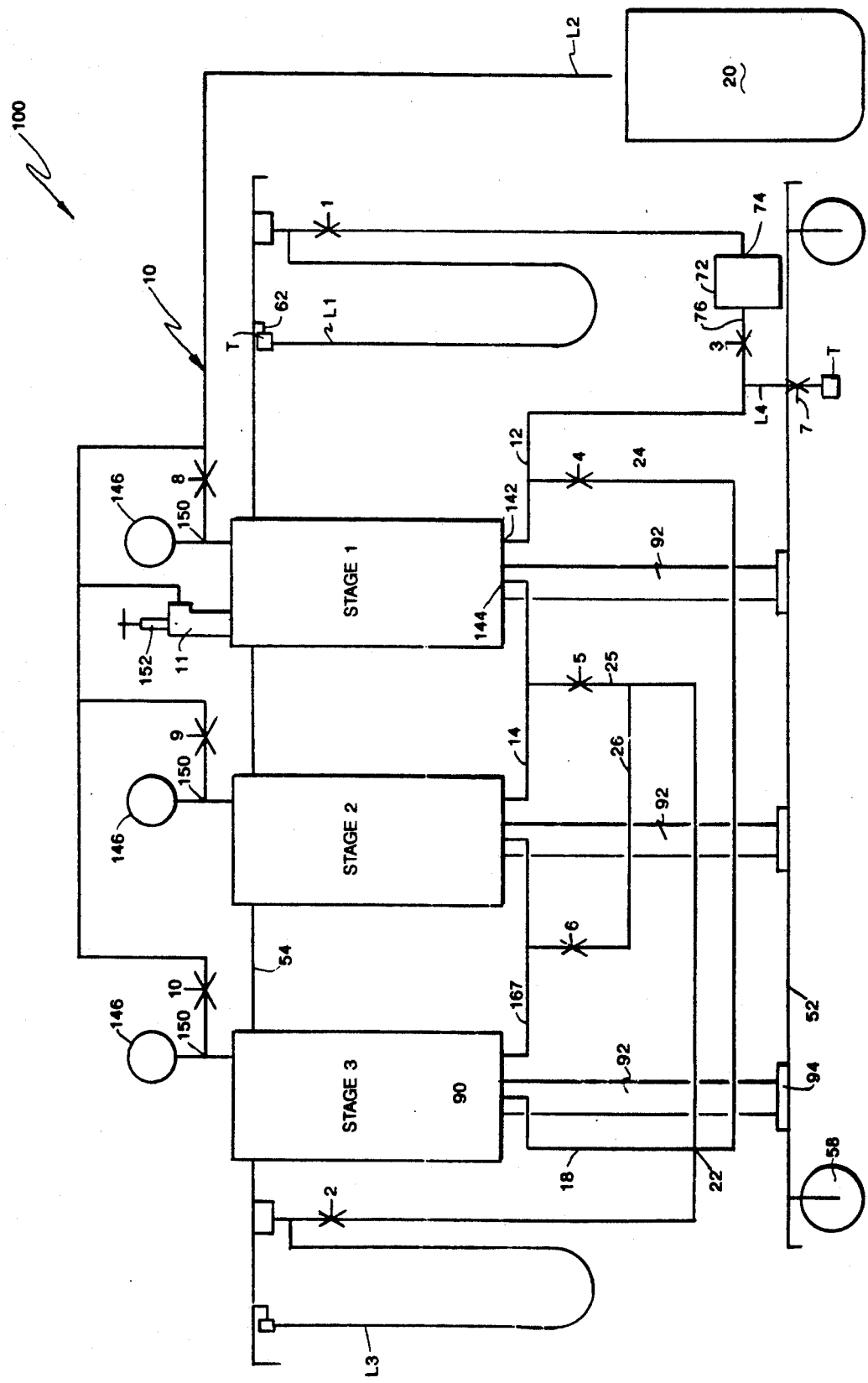
FIG. 3 is a schematic depiction of the fluid circuit in its environment according to the present invention.

Referring now to FIG. 3, the fluidic circuit 10 is shown schematically in conjunction with the filter cart 100. In its essence, there are four lines labeled L1–L4 associated with eleven valves numbered 1 through 11. The manipulation of these lines and these valves in the following sequence will facilitate proper operation of the machine.

Line L-1 and its associated valve 1 define the suction side of the pump 72 and feed cooking oil into the pump's inlet 74. This line is initially placed into a first cooking reservoir having used cooking oil therein. As mentioned supra, free ends of all of the lines preferably include a tip T having a hole 64 located on a side wall of the tip so that cooking oil scavenged therethrough does not pick up the grossest debris normally contained at the bottommost portion of a cooking reservoir.

In most operations, it is desirable to preheat the oil which is to pass through the filter machine. This is essential when the oil being cleaned is of the type which congeals at room temperature since it is highly probable that congealed cooking oil will be present in the filter machine from a prior use. Thus, the heating system associated with the deep fat cooker is used to heat the oil contained in the oil reservoir. Preferably, the impurity laden cooking oil is first heated to approximately 170 degrees whereupon the cooker is turned off. This heated oil is then suitable for cycling through the filter system for the express purpose of preheating the three stages of the filter system. In order to effect same, a second line L-2 has a free end with an outlet that extends within a temporary storage vessel 20 shown in FIG. 3. Line L-2 unites all of the air bleeds 150 discussed with respect to FIG. 2 in a single fluid circuit. Each air bleed is controlled with respect to line L-2 by air vent valves 8, 9, and 10 associated respectively with stage one, stage two and stage three. Thus, the air bleed valve 150 for any of the three stages can be selectively opened for communication with line L-2. In addition, the pressure relief valve PRV-152 defines a valve 11 communicating with line L-2 as shown in FIG. 3. Thus, the three air bleed outlets 150 each are controlled by air valves 8, 9, and 10. With the pressure relief valve 11, all form branches flowing into the L-2 line which in turn communicates with the temporary storage vessel 20 for receiving the cooking oil extracted from a deep fat fryer.

In order to effect preheating, all of the valves in the system are closed except suction valve 1 and air valve 8. Next, mainline valve 3 on the output side of energized pump 72 is opened which will allow fluid exiting the pump 72 to enter the outer passageway 138 of stage 1 of the filter. Thereafter, the heated cooking oil passes through gauge passageway 148, past air bleed 150 and into the temporary storage reservoir 20. It is mere, necessary to touch the outer surface of canister 106 on stage 1 to determine when the stage 1 filter has been sufficiently preheated. Thermal conductivity thus provides both a tactile temperature indication and heat transfer to other metallic filter parts for preheating. Thereafter, valve 8 is closed and valve 9 is cracked open along with valve 4 and valve 5. Valves 4, 5, and 6 also serve as drain valves communicating with inlets and outlets of each of the stages. With the arrangement just described, i.e. valves 4 and 5 open, the impurity laden cooking oil will now pass through stage 2 and its associated outer passageway 138. It is important to note that there is no appreciable passage of the impurity laden cooking oil through the filter during preheating because the resistance to passing through the filter cotton 120 is substantially greater than the resistance in going through the air bleed bypass 150.

Once stage 2 has been sufficiently preheated, valves 5 and 9 are closed and 6 and 10 are opened. Preheating of stage 3 can then begin. Once all three stages have been preheated, the one or more deep fat cooking reservoirs in the kitchen will have been emptied and the impurity laden cooking oil is residing in the temporary storage vessel 20.

At this point, it is convenient to clean out the deep fat cooking reservoirs of the heavy debris contained in the remaining quarter to half inch of oil which resides at the bottom of the reservoir and not picked up by the suction head tip T. Recall that because of the geometrical configuration of placing the hole 64 along a mid portion of the tip T oil will remain in the reservoir. It is recommended that these cooking reservoirs be cleaned with a vacuum, such as a stainless steel tipped vacuum which has been specially constructed to withstand the elevated temperature associated with the cooking oil having had its temperature raised to at least 170 degrees. Once the reservoirs have been cleaned, the cooking oil can now be cleaned of its impurities and returned to the reservoirs.

In order to clean the oil in the temporary storage vessel 20, the suction hose L-1 is placed into the temporary storage vessel 20. All valves are closed at this point except valve 1 associated with line L-1, valve 3 (the main line valve just downstream from the pump 72), and the clean oil discharge valve 2 communicating with line L-3. This line L-3 has its outlet placed in the now cleaned cooking reservoir. With the valves oriented as just discussed, upon energizing the pump 72, impurity laden cooking oil will pass into stage 1 along the outer passageway 138 and then be forced through the filter 120 along the direction of the arrows F shown in FIG. 2. Upon encountering the central inner passageway 140, oil will exit therefrom in which all entrained particles larger than five microns will have been removed. The oil exits first stage filter outlet 144 and proceeds to the second stage for similar conditioning as discussed for stage 1, except that the filter porosity will retain all particles greater than one micron. Lastly, the oil progresses to stage 3 where oil is processed as has been discussed with stages 1 and 2 with the exception that all particles of impurities greater than 0.5 microns will be entrained in the third stage filter. Following the circuit of FIG. 3, the now clean and polished cooking oil exits through line L-3 past valve 2 and into the cleaned cooking reservoir, ready for subsequent reuse.

Two observations should be made at this point. First, each time the pump 72 is shut down, particularly during initialization as has been delineated hereinabove, it is possible and indeed likely that air can be entrained in the various stages which would reduce the efficiency of the filters by providing air pockets exerting a modicum of pressure which precludes utilization of the entire filter surface area 120. To alleviate this, when the cleaning operation to remove entrained impurities from the cooking oil has just begun, line L-2 is kept in fluid communication with the temporary storage vessel 20 and valves 8, 9, and 10 are cracked sequentially. That is, valve 8 and its associated communication with air bleed passageway 150 is opened just slightly until oil passes through the free end of line L-2. This signifies that all air has been bled from stage 1 and valve 8 can then be closed and valve 9 can be cracked a modest amount for similar purging of the air contained within stage 2. Finally, purging stage 3 of air via valve 10 will insure that the entire surface area of each filter is working by cleaning and polishing the cooking oil.

Second, since these machines are intended for industrial use, they are formed from metal such as stainless steel which is capable of expansion upon heating. It is of the utmost importance to provide zero seepage along the interface of the filter 120, the lower cap 102 and the upper cap pressure plate 134. As described supra, the knurled adjuster 132 can bring additional pressure to bear via the pressure plate 134 on the filter. Since the pressure plate 134 and the bottom cap 102 are provided with three concentric O-ring seals 136, tightening of the pressure plate 134 via the knurled adjuster 132 will render it impossible for cooking oil to migrate between the outer passageway 138 and the inner passageway 140 without first having gone through the filter 120. It has been found that sufficient pressure can be delivered to the pressure plate 134 by merely using finger pressure on the knurled adjuster 132.

Typically, most establishments with deep frying capability will maintain a plurality of cooking reservoirs all of which are intended to be operational. The capacity of the machine according to the instant invention will allow a plurality of these reservoirs to be cleaned simultaneously. In addition, when refilling the reservoirs it is recommended that the liquid level upon refilling be somewhat less than the maximum capacity recommended by the manufacturer of the deep fryer. It is thereafter recommended that the remaining portion (e.g. ten percent) be topped off with oil which has not been used before in cooking. Thus, when considering the fact that a portion of the oil used in the daily cooking is imparted to the food being served, the daily addition of a quantum of cooking oil which has heretofore never been used will assure that the oil will never have to be replaced in the deep fat fryer, because it will evanesce with the daily cooking process.

One final operation recommended with respect to the instant invention as a maintenance procedure is draining the machine of oil after use until there is a need for subsequent use. Immediately adjacent the mainline valve 3 there is a line L-4 at the pump discharge header configured as a tube having a cap on an end thereof. This tube serves as a drain and is strategically positioned to be at the lowermost portion of the apparatus which contains or allows the through passage of oil. To empty the machine, place line L-4 in a clean container used for storing oil to be purged from the machine. Open valve 7 and attach line L-2 to a source of compressed air (not shown). Once air is forced into line L-2, line L-4 will be purged of oil contained there within. Thereafter, valve 7 is closed, and line L-1 is placed in the storage vessel with valve 1 open to blow out line L-1. The same procedure is followed for line L-3 and valve 2, and in turn each stage is purged with air by cracking valves 8, 9, and 10 respectively for stages 1, 2, and 3 to remove as much oil as possible from the machine.

In addition, tube L-4 is then again placed in the storage vessel and allowed to drain out whatever oil remains in the lines. At this point, the operation is complete and all the equipment can be secured.

Attention is now directed to a lower portion of FIG. 3 which shows the network of circuitry allowing communication between the various stages. As shown, a branch 12 communicates from the discharge 76 of pump 72 with the inlet 142 of stage 1. This branch 12 includes the main shut off valve 3 and a drain valve 4. The outlet 144 from stage 1 communicates with the inlet of stage 2 via branch conduit 14. This conduit also includes a drain 5. Next, stage 2's outlet communicates with stage 3's inlet via connecting branch 16. Branch 16 is similarly provided with a drain valve 6. Lastly, the polished oil leaving the outlet of stage 3 exits via branch 18. Branch 18 and branch passages 24, 25, and 26 (i.e. the down stream flow branch from drain valves 4, 5, and 6 respectively) are all placed in fluid communication at node 22. This network in turn communicates with line L-3 via valve 2.

It is contemplated that for ease in use and to increase the likelihood that persons exposed to minimal training can operate this device proficiently, all valves will either be tagged or color coded for correlation with an easy to read reference chart. In addition, it should be noted that the construction delineated hereinabove lends the device for rapid disassembly when maintenance is required. The inventor's experience suggests that the filter elements (which are capable of being recycled) will require maintenance once every two weeks. Even with these factors taken into consideration, the instant invention provides substantial savings for those establishments using deep fat fryers.

Although the system described is intended for use with a 220 volt system, a 110 volt system will also power this device upon appropriate modification of the system with respect to the power requirements of the motor and pump.

Moreover, having thus described the invention, it should be apparent that numerous structural modifications and adaptations may be resorted to without departing from the scope and fair meaning of the instant invention as set forth hereinabove and as defined hereinbelow by the claims.

I claim:

1. A method for removing solid impurities from a fluid, the step including:
   preheating the fluid,
   scavenging all of the impurity laden now heated fluid from a reservoir except for the heaviest and most densely laden fluid borne impurities at a bottom of the reservoir,
   transferring the scavenged heated fluid into a temporary storage vessel,
   cleaning the reservoir of all impurities, including residual fluid,
   preheating filters with the scavenged heat fluid,
   additionally preheating a series of filters by alternatively heating the filters in series, one at a time, and only heating an inlet passageway of each filter, relying on thermal conductivity to heat remaining portions of the filter, filtering the scavenged fluid to remove solid impurities therefrom, returning the filtered fluid to the reservoir for reuse, and topping off the reservoir with new fluid to replenish unreclaimed fluid.

2. A method for removing solid impurities from a fluid, the steps including:

scavenging all of the impurity laden fluid from a reservoir except for the heaviest and most densely laden fluid borne impurities at a bottom of the reservoir, transferring the scavenged fluid into a temporary storage vessel, cleaning the reservoir of all impurities, including residual fluid, preheating a series of filters by alternatively heating the filters in series, one at a time, and only heating an inlet passageway of each filter, relying on thermal conductivity to heat remaining portions of the filter, filtering the scavenged fluid to remove solid impurities therefrom, returning the filtered fluid to the reservoir for reuse, and topping off the reservoir with new fluid to replenish unreclaimed fluid.

3. The method of claim 2 including the step of preheating the scavenged fluid prior to transfer into the temporary storage vessel.

4. The method of claim 3 including purging each filter of entrained air during the filtering process.

5. The method of claim 4 including preheating filters with the scavenged fluid prior to removing solid impurities therefrom.

6. The method of claim 4 purging the filters with air subsequent to their having removed the solid impurities from the fluid.

7. The method of claim 6 including forming the series of filters with decreasing micron size emissivity to have successive stages filtering particles of successively smaller dimension.

8. A method for removing solid impurities from a fluid, the steps including:

scavenging all of the impurity laden fluid from a reservoir except for the heaviest and most densely laden fluid borne impurities at a bottom of the reservoir, transferring the scavenged fluid into a temporary storage vessel, cleaning the reservoir of all impurities, including residual fluid, filtering the scavenged fluid to remove solid impurities therefrom, returning the filter fluid to the reservoir for reuse, and topping off the reservoir with new fluid to replenish unreclaimed fluid, including the steps of preheating the scavenged fluid prior to transfer into the temporary storage vessel, and preheating a series of filters with the scavenged fluid prior to removing the solid impurities therefrom, wherein the filters are preheated by alternatively heating the filters in series, one at a time, and only heating an inlet passageway of each filter, relying on thermal conductivity to heat remaining portions of the filter.

9. The method of claim 8, including purging each filter of entrained air during the filtering process.

10. The method of claim 9 purging the filters with air subsequent to their having removed the solid impurities from the fluid.

11. The method of claim 10 including forming the series of filters with decreasing micron size emissivity to have successive stages filtering particles of successively smaller dimension.

12. A device for filtering solid impurities entrained in a fluid, compromising, in combination:

a fluid pump having an inlet port and an outlet port, a suction hose connected to said inlet port and adapted to scavenge impurity laden fluid from a source to said pump, filter means connected to said pump outlet port to receive the fluid and remove the solid impurities therefrom, a discharge line connected to said filter means, receiving impurity free fluid therefrom and adapted to return the fluid to its source whereby the fluid has been cleaned and suitable for reuse, air bleed means associated with said filter means and communicating with an inlet passageway of said filter means to bypass said filter means when initializing said device by preheating said filter means wherein said filter means is heated by passing the fluid through said filter inlet passageway and past said air bleed means in a heated state, a drain line interposed between said outlet port of said fluid pump and said filter means including a valve for selectively opening said drain line for purging said device after use, wherein said device is carried on a cart for ease in transport, said cart formed from an upper and lower platform, one spaced above the other in different horizontal planes, and interconnected by a plurality of vertically extending legs, coasters extending from a lower portion of said lower platforms and adapted to traverse a supporting surface, said upper platform including a downwardly depending lip provided with a series of inwardly directed prongs upon which said lines are hung for storage and unobtrusiveness in transit, a control box on a top surface of said upper platform including a power switch connected in series to a timer and to said pump and an associated motor for selectively energizing said pump and motor, wherein said filter means includes a pedestal supported on said lower platform and extending upwardly therefrom, a bottom cap supported on a topmost surface of said pedestal, said bottom cap including means for connecting a lower portion of a canister thereto and receiving a filter there within, a top cap sealing a top portion of said canister including a pressure plate exerting force on said filter, said top cap extending above said upper platform whereby said canister extends through openings passing through said upper platform and supporting said canister, said filter having a hollow central portion defining an outlet passageway and an outer surface spaced from an inner surface of said canister defining an inlet passageway, whereupon fluid to be cleaned of impurities passes through said filter.

13. A device for filtering solid impurities entrained in a fluid, comprising, in combination:

a fluid pump having an inlet port and an outlet port, a suction hose connected to said inlet port and adapted to scavenge impurity laden fluid from a source to said pump, filter means connected to said pump outlet port to receive the fluid and remove the solid impurities therefrom, and a discharge line connected to said filter means, receiving impurity free fluid therefrom and adapted to return the fluid to its source whereby the fluid has been cleaned and suitable for reuse, wherein said filter means includes a pedestal, a bottom cap supported on a topmost surface of said pedestal, said bottom cap including means for connecting a lower portion of a canister thereto and receiving a filter there within, a top cap sealing a top portion of said canister including a pressure plate exerting force on said filter, said top cap extending above an upper platform of a transport cart, whereby said canister extends through openings passing through said upper platform and supporting said canister, said filter having a hollow central portion defining an outlet passageway and an outer surface spaced from an inner surface of said canister defining an inlet passageway, whereupon fluid to be cleaned of impurities passes through said filter.

14. The device of claim 13 including plural said filters connected in series for successive filtering of progressively smaller sized impurities.

15. The device of claim 13 including air bleed means associated with said filter means and communicating with an inlet passageway of said filter means to bypass said filter means when initializing said device by preheating said filter means wherein said filter means is heated by passing the fluid through said filter inlet passageway and past said air bleed means in a heated state.

16. The device of claim 15 including a drain line interposed between said outlet port of said fluid pump and said filter means including a valve for selectively opening said drain line for purging said device after use.

17. The device of claim 16 wherein said device is carried on a cart for ease in transport, said cart formed from an upper and lower platform, one spaced above the other in different horizontal planes, and interconnected by a plurality of vertically extending legs, coasters extending from a lower portion of said lower platform and adapted to traverse a supporting surface, said upper platform including a downwardly depending lip provided with a series of inwardly directed prongs upon which said lines are hung for storage and unobtrusiveness in transit, a control box on a top surface of said upper platform including a power switch connected in series to a timer and to said pump and an associated motor for selectively energizing said pump and motor.

18. The device of claim 17, wherein said filter means includes a pedestal supported on said lower platform and extending upwardly therefrom, a bottom cap supported on a topmost surface of said pedestal, said bottom cap including means for connecting a lower portion of a canister thereto and receiving a filter element there within, a top cap sealing a top portion of said canister including a pressure plate exerting force on said filter, said top cap extending above said upper platform whereby said canister extends through openings passing through said upper platform and supporting said canister, said filter having a hollow central portion and an outer surface spaced from an inner surface of said canister, said last name space serving as an inlet passageway and said hollow central portion serving as an outlet passageway whereupon fluid to be cleaned of impurities passes through said filter.

19. A filter means for removing food solids from a cooking fluid comprising, in combination:

a housing formed by a bottom wall, a top wall and a side wall interconnecting said top and bottom walls defining an interior of said housing, a filter element carried within said housing interior supported by said top and bottom walls and spaced from said side wall to define a first compartment, said filter element having a hollow core defining a second compartment, said first and second compartments separated from each other by filter media and a seal between said media and said top and bottom walls, and pressure means including an inlet line provided with a tip having an inlet hole spaced from a terminus of said tip to preclude admission of the grossest food solids, and said pressure means operatively coupling said filter element and said inlet line and forcing the fluid through the filter media and from one compartment to the other to clean the fluid wherein said filter means are carried on a transportable cart which is separate from a cooking appliance, said cart having wheels engaging a supporting surface for alternatively using and storing said device in a facile manner, including a pressure plate extending down from said top wall and addressing a top surface of said filter element, means for increasing pressure of said pressure plate against said filter to offset effects of expansion in the presence of heat, and a plurality of concentrically disposed sealing rings on said pressure plate facing and abutting said filter element, a plurality of concentrically disposed sealing rings on a top surface of said bottom wall similarly contacting said filter element to increase the likelihood that the fluid is treated through the filter element rather than seep beyond said element, including a fluid inlet communicating with said first compartment to deliver fluid thereat, and an air bleed outlet in fluid communication with said first compartment provided with an air purge valve to remove air therefrom, wherein said air purge valve has a pressure gauge operatively coupled to said first compartment, wherein plural filter means are provided in series connected such that the outlet of a first filter means is connected to an inlet of a second filter means and successive filter means are similarly connected in series, said filter elements of successive filter means having increasingly smaller particle size emissivity characteristics to further retain impurities contained within the fluid at successive stages of said filter means and further polish the fluid.

20. The claim of claim 19 wherein said pressure means is formed from a pump driven motor and includes an inlet communicating with a suction line for delivering fluid under pressure to said filter means, and said last in said series of filters includes a discharge line for returning clean polished fluid back to its original source.

* * * * *